United States Patent [19]

Foster

[11] Patent Number: 5,337,329
[45] Date of Patent: Aug. 9, 1994

[54] FLUID LASER HAVING A ROUGHENED, CATALYTIC INNER SURFACE

[76] Inventor: Jack Foster, 856 Renetta Ct., Los Altos, Calif. 94022

[21] Appl. No.: 911,679

[22] Filed: Jul. 7, 1992

[51] Int. Cl.$^5$ .............................................. H03S 3/10
[52] U.S. Cl. ........................................ 372/61; 372/59
[58] Field of Search ..................... 372/33, 59, 61, 87

[56] References Cited

U.S. PATENT DOCUMENTS

| | | | |
|---|---|---|---|
| 4,756,000 | 7/1988 | Macken | 372/59 |
| 4,873,693 | 10/1989 | Cook, Jr. | 372/33 |
| 4,897,848 | 1/1990 | Macken | 372/59 |
| 4,991,181 | 2/1991 | Upchurch | 372/59 |
| 5,148,440 | 9/1992 | Duncan | 372/59 |

OTHER PUBLICATIONS

C. S. Ashley and S. T. Reed, "Sol–Gel Derived AR Coatings for Solar Receivers", National Technical Information Service DE 85000192 SAND-84-0662, pp. 3–16. (Sep. 1984).

*Primary Examiner*—James W. Davie
*Attorney, Agent, or Firm*—John A. Frazzini

[57] ABSTRACT

A laser having a roughened, catalytic surface to regenerate fluid within the lasing chamber that decomposes during operation of the laser. The roughness of this surface greatly increases its surface area thereby greatly increasing the rate of action of this catalytic surface in regenerating fluid. This structure is particularly useful in producing small, handheld $CO_2$ lasers.

11 Claims, 2 Drawing Sheets

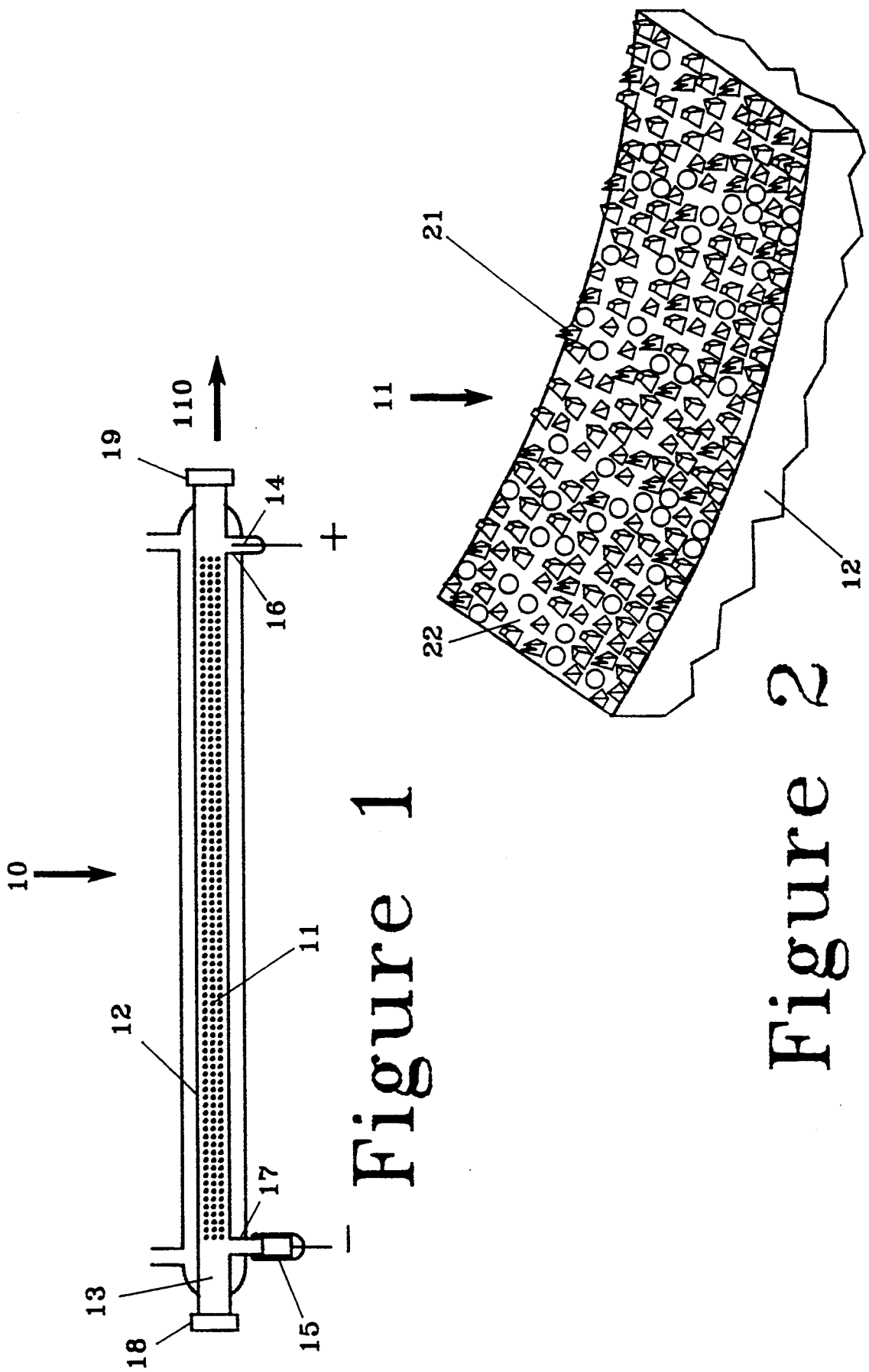

FLUID LASER HAVING A ROUGHENED, CATALYTIC INNER SURFACE

FIELD OF THE INVENTION

This invention relates to lasers in which the lasing medium is a fluid within an enclosing wall and relates more particularly to such lasers having within such enclosure a catalyst to facilitate regeneration of decomposed lasing fluid. Although this invention is applicable to any type of laser having a fluid lasing medium that can decompose during operation of the laser, it has particular application to a gas $CO_2$ laser and will be illustrated herein in regard to this particular choice of laser.

CONVENTION REGARDING REFERENCE NUMERALS

In the figures, the first digit of a reference numeral indicates the first figure in which is presented the element indicated by that reference numeral. If an element is in more than one figure, the same reference numeral will be used to identify that element in all such figures.

BACKGROUND OF THE INVENTION

A significant problem in $CO_2$ lasers is the decomposition of the $CO_2$ in response to the impact of electrons that are utilized to excite the $CO_2$ molecules, such as by the following reactions:

  (1)

  (2)

where "e" represents an electron in the electrical discharge through the $CO_2$ that excites these gas molecules into excited states from which photons can be emitted as part of the lasing process. Unfortunately, these reactions can result in more than 60% of the $CO_2$ within the laser being decomposed. This results in a loss of power and gain and, for small lasers, can even prevent lasing.

Several approaches have been adopted to address this problem. In one such class of lasers, a fresh supply of the gas mixture (typically consisting of $CO_2$, $N_2$, He) continuously flows through the laser chamber. However, because this mixture is approximately 80% helium, such lasers exhibit a significant rate of helium consumption (on the order of 100 liters/hour for a 1000 Watt laser), which is not only costly, but a wasteful use of a limited resource. The helium is included, because its small atomic mass and inert chemical activity make it ideal for conducting heat away from the region within which the $CO_2$ is induced to lase (i.e., the "lasing region").

In a second class of $CO_2$ lasers, this gas is pumped past a heated catalyst, such as platinum, located external to the laser chamber to regenerate the $CO_2$. Unfortunately, in such lasers, about 10% of the gas must still be dumped in each cycle. In a third class of $CO_2$ lasers, attempts have been made to include such a heated catalyst within the laser chamber. However, such heated catalysts increase the gas temperature to a level that prevents lasing. In a fourth class of $CO_2$ lasers, the laser gas is passed through an ambient temperature granular catalyst (such as platinum on tin oxide, Hopcalite or cobalt oxide) located outside of the laser chamber.

In U.S. Pat. No. 4,756,000 entitled *Discharge Driven Gold Catalyst With Application To A $CO_2$ Laser*, issued on Jul. 5, 1988 to John A. Macken, a gold catalyst is coated onto the inside surface of the laser chamber wall to catalyze reconstitution of the $CO_2$. In order to prevent this layer of gold from shorting out the discharge process, this gold layer is divided into electrically insulated islands of gold, of length (along the axis of the cylindrical laser chamber) preferably less than half the diameter of the cylindrical laser chamber. Alternatively, the gold is deposited as "*microscopically divided gold*" (i.e., microscopic granules of gold) on the inside surface of the laser chamber wall or the gold is processed to form such granules after deposition on the laser chamber wall. Analogous lasers employing a silver oxide catalyst are presented in an associated patent application entitled *Discharge Driven Silver Oxide Catalyst With Application To A $CO_2$ Laser*.

Lasers typically exhibit a peak efficiency (i.e., the ratio of output power to input power) as a function of input power and therefore are normally operated at such optimal input power. Fabry-Perot type fluid lasers are typically operated in a TEM00 mode, because this cylindrically symmetric mode of laser light can be well focused by conventional optical elements. The main thermal effect in a gas discharge is the transfer of thermal energy from the electrons to translational and rotational energy of the gas that produces the inversion in the laser.

For the following reasons, lasers typically exhibit a power that varies linearly with the length of the cylindrical lasing region and is substantially independent of the diameter of the lasing region. For the electron temperature profiles of two discharges to be similar, it can be shown that the power per unit length (i.e., $E_A \bullet I$, where $E_A$ is the axial electrical field strength and I is the axial current) must be the same for both discharges. The power of such a laser is therefore proportional to its length.

A corresponding similarity law for the diameter D of the cylindrical laser cavity to have optimum electron energy distribution requires that the product $E_A \bullet D$ be the same for both discharges. In combination with the above relation between $E_A$ and I, this requires that the ratio I/D be the same for both discharges. Because of these relations, the power of a TEM$_{00}$ mode can be as high as for a higher order mode. A typical $CO_2$ laser has a 9 mm inside bore (i.e. 9 mm inside diameter) and a length on the order of 1.3 meters and exhibits a power of approximately 40 Watts/m times the length of the lasing region.

In certain applications in medicine, such as removing freckles, it would be advantageous to have a handheld laser that can be comfortably held by a technician and can produce a beam of approximately 5–10 Watts. Unfortunately, a conventional 10 Watt $CO_2$ laser exhibiting a typical 20% efficiency is approximately 25 cm long. For convenience of use, such a laser should have a length on the order of the length of a person's palm (on the order of 12 cm). Therefore, it would be very useful to produce a $CO_2$ laser exhibiting at least twice the output power per unit length of conventional $CO_2$ lasers.

SUMMARY OF THE INVENTION

In accordance with the illustrated preferred embodiment, a fluid laser is presented that exhibits about a two-fold increase in output power per unit length compared to analogous conventional fluid lasers. On a surface within the laser chamber, a catalytic coating is produced that exhibits a toughened surface texture. Such a roughened surface exhibits a much larger surface per unit length of the laser than does a smooth surface, thereby providing a comparably greater rate of catalytic regeneration of the lasing fluid.

By a "smooth" inner surface is meant a surface area that is no more than 1.3 times its surface area if it were a perfectly smooth material. By a "roughened surface" is meant a surface that has an area at least 1.3 times the surface area of a perfectly smooth surface having the same macroscopic shape. By "macroscopic shape" is meant the shape of the surface over dimensions comparable to the lateral or longitudinal dimensions of the laser. For example, a cylindrical wall has the macroscopic shape of a cylinder, but can have a surface that is roughened in the manner illustrated in the embodiments discussed below to produce a surface that also varies over dimensions much smaller than the dimensions of the cylinder. Likewise, a corrugated surface is considered to be a macroscopic pattern of the surface rather than a roughening of the surface.

Such increased catalytic surface area per unit length of the laser produces a proportionally greater rate of catalytic regeneration of fluid that has been decomposed during operation of the laser. This roughened surface is preferably the inner surface of a (typically cylindrical) side wall that encircles the laser chamber, because this avoids the need for an additional surface for the catalytic surface and because the inner surface of the sidewall has a reasonably large area suitable for supporting this catalytic coating.

This roughened texture can be produced by several ways, including: depositing on a smooth inner surface of the laser chamber wall a lumpy solution of the catalyst; or depositing a catalytic coating (smooth or lumpy) on a roughened inner surface of the laser chamber. Such a roughened inner surface can be produced, for example: by ablating or etching a smooth surface to produce a pitted surface of increased area; by depositing on a smooth surface a lumpy, gritty or highly porous material; or by cutting or scratching this surface to produce either a regular or irregular set of intersecting, grooves that produce a regular or irregular pattern projecting regions. For V-shaped grooves, these projecting regions have the shape of pyramids and/or truncated pyramids.

The roughened surface can also be produced by depositing on the inner surface of the laser chamber wall a material that is then processed to produce a roughened texture. For example, when a thin layer of activated carbon, zeolite or sol gel is produced on the inner surface with sufficiently large pores that the catalytic material can flow into and coat the inner surfaces of such pores, the area per unit length of the inner surface of the laser chamber wall can be increased by several orders of magnitude.

DESCRIPTION OF THE FIGURES

FIG. 1 is a side cross-sectional view of a $CO_2$ laser having a roughened, catalytic inner surface.

FIG. 2 is a perspective view of a portion of a roughened, catalytic inner surface that has been roughened by means of particles attached to a smooth inner surface of side wall of the laser chamber.

DESCRIPTION OF THE PREFERRED EMBODIMENTS

Figure 3:
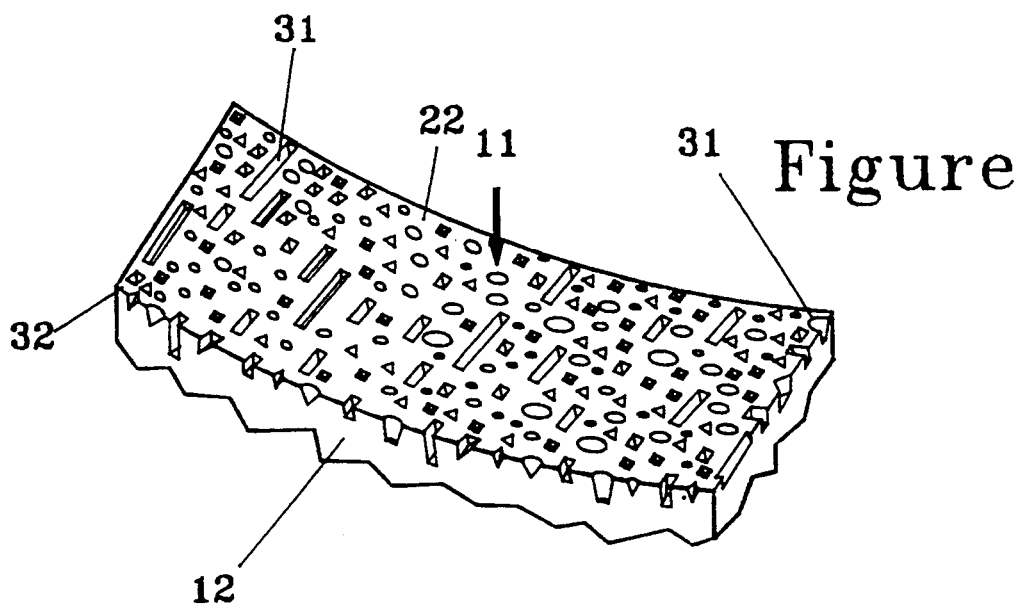
FIG. 3 is a perspective view of a portion of a roughened, catalytic inner surface that has been roughened by means of the formation of craters in a smooth inner surface of the side wall of the laser chamber.

FIG. 1 is a side cross-sectional view of a $CO_2$ laser 10 having a roughened, catalytic inner surface 11 of a sidewall 12 that encircles a laser chamber 13 within which a fluid, such as $CO_2$ gas, is induced to lase by means of an electrical discharge between an anode 14 and a cathode 15. In other embodiments, the electrical discharge can be produced by other means such as rf discharges or electron cyclotron resonance. In the case of a $CO_2$ laser, the lasing fluid is preferably a mixture of $CO_2$, $N_2$, He, Xe, CO and $H_2O$, where these gases typically are present at a pressure-diameter product on the order of 235 Torr-mm and at a composition on the order of: 74% He, 16% $N_2$, 6% $CO_2$, 3% Xe, 0.6% CO, and 0.2% $H_2O$. During operation, the ratio I/D of the current I between anode 14 and cathode 15 to the diameter D of the tube is typically on the order of 5.5 mA/mm. The product of the operating positive column electric field $E_A$ times the inside diameter D of the tube is on the order of 90 volts and the combined voltage drop through the plasma between the anode and the cathode is on the order of 200 volts.

Although this invention will be illustrated in terms of a $CO_2$ laser, its design is also applicable to any laser utilizing a fluid medium that can be induced to lase, that can be decomposed during operation of this laser and that can be regenerated by contact with the toughened, catalytic, inner surface 11. Although this particular embodiment is in terms of a sealed chamber in which there is no circulation of the lasing fluid, it is also applicable to flow-through type lasers in which the lasing fluid flows through the laser chamber. The flow-through type lasers can utilize closed circuit circulation as well as open circuit circulation in which all or part of the lasing fluid is recirculated through the laser chamber. A pair of sealed tubes 16 and 17 contain the anode 14 and the cathode 15, respectively. The ends of laser 10 are closed and contain a highly reflecting mirror 18 and a partially reflecting mirror 19, so that a laser beam 110 is produced through partially reflecting mirror 19.

FIG. 2 is a perspective view of a portion of a roughened, catalytic inner surface 11 that has been roughened by means of particles 21 attached to a smooth inner surface 22 of side wall 12 of the laser chamber. By a "smooth inner surface" is meant a surface that has a surface area no more than 1.3 times the surface area it would have if it were perfectly smooth.

It is preferred that the particles be inorganic, refractory, insulator materials, with minimal chemical reaction with the gases, such as atomic oxygen or carbon monoxide, within the laser chamber. For this class of particles, if any of such particles were to protrude through an overlying catalytic coating, it would not interfere with the operation of the laser. Quartz particles and silver oxide particles have been used to produce this roughened, catalytic inner surface 11.

In one method of producing these particles, a quartz surface was ground by an optical grinder and the particles of interest were separated by mixing these grindings with water and pouring off the water and particles that had not settled within about a minute. After air drying, this powder had the consistency of flour. This powder was mixed with a solution consisting of approximately 10% by volume gold resinate (Englehard #8300 gold resinate 28% metal) in methyl ethyl ketone solvent, producing a thin, paint-like consistency. This mixture was applied to the smooth inner surface 22 by means of a cotton swab attached to a metal rod. A gentle flow of air was applied through the laser sidewall for a few minutes to evaporate all of this solvent. This produced a lumpy, catalytic surface.

The particle-coated inner surface 22 was then heated over a few minute period to 280° C. and maintained at this temperature for about an hour before being allowed to cool over a several minute period to room temperature. This process removes most of the organic solvent and converts some of it to carbon. The resulting gold coating is only weakly adherent and can be easily wiped off with a cotton tipped swab that has been soaked in acetone. However, this weak adherence to the inner surface 11 is sufficient to produce a long-lived laser. A laser having a 5 mm inner diameter tube coated by this process was able to achieve catalyst-enhanced lasing, even though an identical laser without such coating was unable to achieve catalyst-enhanced lasing.

The mixture of particles and gold resinate binds to the inner surface 22 about as strongly as does the gold resinate alone. It is preferable that a stronger level of adhesion be achieved so that particles will not be pulled off of the wall by the electrical discharge. In general, such particles can be bonded to the inner surface 22 by any adhesive that does not interfere with operation of the laser. The particles can be included within the adhesive when it is applied or can be applied after the adhesive is applied to inner surface 22. The adhesive should have a low enough viscosity that, after it dries, the resulting surface has a substantially increased surface area. The adhesive can be applied concurrently to distribution of particles onto the wall, it can be applied to the wall before the particles are distributed onto the wall, or it can be deposited onto the wall after the particles are distributed onto the wall. For example, a thin layer of gold can be sputtered onto the particles and wall by sputtering the gold over the particle-coated wall. In such a process, a copper wire and a gold wire are inserted along the axis of sidewall 12. An electric discharge is produced between these two wires in low pressure gas (approximately 15 torr He). The gold wire, which functions as the cathode, is sputtered by ion impact on the cathode. The resulting gold coating not only provides the desired catalytic action, it also functions as an overlying adhesive to hold the particles in place against inner surface 22.

The particle sizes should be small compared to the inner diameter of the inner surface 22, but larger than atomic dimensions— that is, they should be in the range from approximately 10 nm to about 50,000 nm. In lasers, such as waveguide lasers, in which the wall reflection is a propagation mode, the amount of roughening of the inner surface 22 is determined by a trade off between the increased catalytic effect due to the increased surface area of the roughened inner surface 11 and the increase in losses, because of scattering of the laser waves by such roughened surface. However, in lasers that have free space modes, the scattering by the roughened surface is beneficial because it decreases whisper modes by reflection from this roughened surface.

FIG. 3 is a perspective view of a portion of a roughened, catalytic inner surface that has been roughened by forming craters 31 in a smooth inner surface 22 of the side wall 12 of the laser chamber. These craters can be formed by means of a jet of air containing fine, abrasive particles, such as SiC particles. This abrasion of the smooth inner surface 22 is preferably achieved early in the tube production cycle to enable cleaning of the abrasive particles from all parts of the tube.

Figure 4:
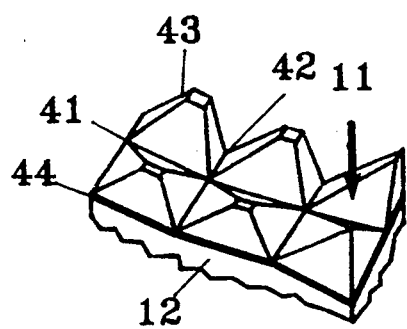
FIG. 4 is a perspective view of a portion of a roughened, catalytic inner surface that has been roughed by cutting or scratching at least a pair of spiral, approximately v-shaped grooves to produce approximately pyramidal regions of this surface.

FIG. 4 is a perspective view of a portion of a roughened, catalytic inner surface 11 that has been roughed by cutting a pair of spiral v-shaped grooves 41 and 42 to produce pyramidal regions 43 of this surface. The sidewall 12 typically is glass or ceramic and, for handheld applications, should have a length on the order of 20 cm, an outer diameter on the order of 7 mm and a wall thickness on the order of 1 mm. Each spiral is cut to a depth of about 1–10 microns and has a pitch such that approximately rectangular pyramidal regions 43 are produced (either truncated or non-truncated pyramids). Preferably, these pyramids are not truncated so that there will be a maximal increase in surface area. The fractional increase in surface area for untruncated pyramids is just the ratio between the area of the sidewalls of the pyramid and the base of the pyramid (i.e., $(1+4*H^2/L^2)^{\frac{1}{2}}$, where H is the height of the pyramid and L is the length of a side of such pyramid) and thus would more than double the surface area if H and L were approximately equal. A catalytic layer 44 is applied on this roughened surface to produce a catalytic layer of increased activity because of the increase in its surface area caused by of the roughening of the surface on which it is deposited.

A similar embodiment can be more easily manufactured that, instead of having a pair of intersecting spiral grooves, has many intersecting, approximately spiral grooves. This is achieved by inserting a piece of sandpaper into a tube, having a smooth inner surface, and rotating the paper as it is pushed through the tube to produce either right or left handed spiral grooves. This step is then repeated at least once with the sandpaper being pulled through the tube to produce grooves of the opposite handedness.

The best results have been achieved when the grooving is followed by a chemical etch to add pits and deepen grooves. A 5 mm bore tube shows good catalytic effect when processed in this manner. A 4 mm bore tube has shown little catalytic effect after this treatment. It therefore appears that the percentage increase in surface area by these roughening steps must be at least 80% (i.e., {(9 mm−5 mm)/5 mm}), because a 9 mm bore laser having a smooth inner wall 22 will have catalyst-enhanced lasing without its inner surface roughened, but a laser as small as 5 mm bore will have catalyst-enhanced lasing as long as its inner surface is roughened. Conversely, because the 4 mm bore laser does not have catalyst enhanced lasing even if its inner surface is roughened with grooves, it appears that the increase in inner surface area by groove roughening is less than 125% (i.e., {(9 mm−4 mm)/4 mm}).

Figure 5:
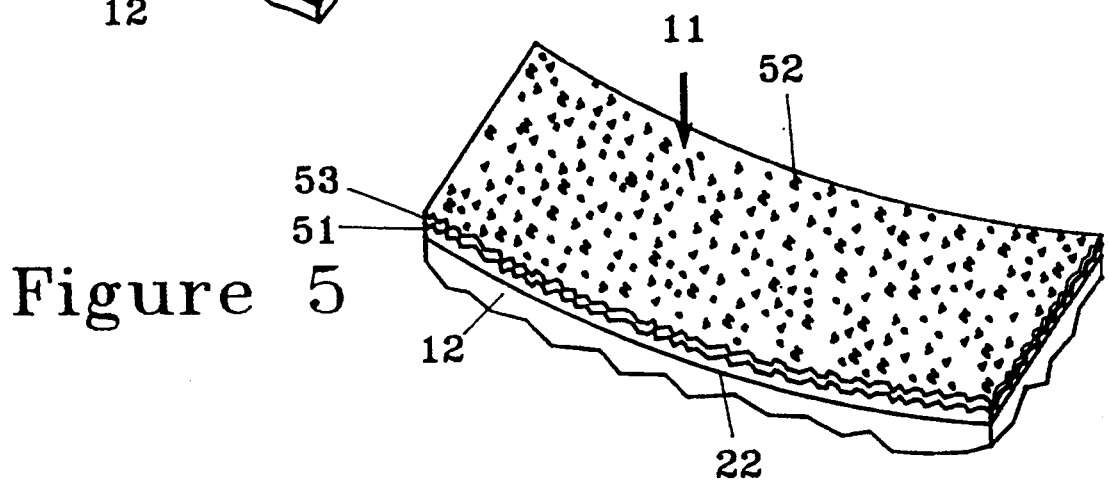
FIG. 5 is a lateral, cross-sectional view of the inner surface of a laser chamber sidewall that has been roughened by production on this inner surface of a coating, such as activated charcoal coating or a sol gel, having a large surface area-to-volume ratio.

FIG. 5 is a lateral, cross-sectional view of the inner surface of a laser chamber sidewall that has been roughened by production of a porous coating 51 (e.g., activated charcoal, zeolite or sol gel) on this smooth inner surface 22. The high, fractional volume of voids 52 in activated charcoal, zeolite or sol gel produces a tremendous increase in the surface area (>100 times the surface area). The layer of activated charcoal, zeolite or sol gel is coated with a catalytic layer 53. For applications in a $CO_2$ laser, suitable choices for the catalytic layer are silver oxide and gold. Because any exposed regions of activated charcoal substrate will react with the environment within the laser during laser operation, it is important that the activated charcoal be thoroughly coated with a protective coating, preferably the layer of catalyst. Such coating can be applied as a resinate or by chemical vapor deposition to facilitate penetration of the coating into the crevices of the activated charcoal.

The roughened, catalytic surface 11 can also be produced by production of a layer 51 of sol gel on inner surface 22 and then coating that sol gel layer with a layer 53 of gold or silver as indicated above. Methods of producing sol gel layers are well known in the literature, such as in the field of spectrophotometric analysis of organic chemicals or the field of antireflection coatings. One method of producing a sol gel layer on a glass substrate is presented in the publication by Carol S. Ashley and Scott T. Reed entitled *Sol-Gel Derived AR Coatings for Solar Receivers*, Sandia National Laboratories publication SAND84-0662, September 1984, p. 3-16, which is hereby incorporated herein by reference. An aged, polymeric sol-gel solution, consisting of $SiO_2$ (71 wt %), $B_2O_3$ (18 wt %), $Al_2O_3$ (7 wt %) and $BaO$ (4 wt %), is applied to the inner surface 11 and heated to form a durable, porous glass layer. Added porosity can be produce by etching the resulting surface in 0.26N $H_2SiF_6$/0.015% $NH_4HF_2$ for 3-5 minutes at room temperature.

A gold coating can then be applied either by sputtering in vacuum from a gold cathode wire that is side-by-side with an anode wire of copper or stainless steel that provides electrons that bombard the gold wire to sputter gold from this wire onto the sol-gel-coated inner surface 11. The gold layer can also be deposited using a gold resinate solution.

Figure 6:
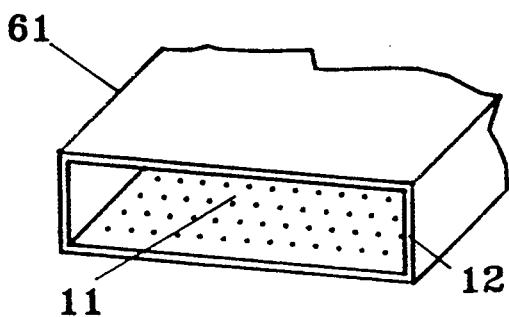
FIG. 6 is a perspective cross-sectional view of a portion of a waveguide slab laser having a toughened, catalytic inner surface.

FIG. 6 is a perspective cross-sectional view of a portion of a waveguide slab laser 61 having a roughened, catalytic inner surface 11. This embodiment is included to illustrate that the benefits of the use of a roughened, catalytic inner surface are not limited to a single class of lasers.

I claim:

1. A laser comprising:
a wall encircling a laser chamber;
means for producing an electrical discharge within said chamber;
a reflector structure adapted to reflect light in a path that produces lasing of a fluid within said laser chamber; and
a roughened, catalytic surface, that has been roughened by attachment of particles and then coated with a layer of catalytic material to increase an amount of area of this catalytic material that is in contact with said fluid to catalyze recombination of a portion of this fluid that has decomposed within said chamber.

2. A laser comprising:
a wall encircling a laser chamber;
means for producing an electrical discharge within said chamber;
a reflector structure adapted to reflect light in a path that produces lasing of a fluid within said laser chamber; and
a roughened, catalytic surface, that has been roughened by ablation and then coated with a layer of catalytic material to increase an amount of area of this surface that is in contact with said fluid to catalyze recombination of a portion of this fluid that has decomposed within said chamber.

3. A laser as in claim 2 wherein said roughened, catalytic surface is pitted.

4. A laser as in claim 2 wherein said roughened, catalytic surface is roughened by at least one groove cut into this surface.

5. A laser as in claim 4 wherein said roughened, catalytic surface comprises: an inner surface of a sidewall of said laser in which grooves have been cut to produce a plurality of pyramidal regions.

6. A laser as in claim 5 wherein said grooves are in the form of randomly intersecting spiral grooves.

7. A laser comprising:
a wall encircling a laser chamber;
means for producing an electrical discharge within said chamber;
a reflector structure adapted to reflect light in a path that produces lasing of a fluid within said laser chamber; and
a roughened, catalytic surface, that has been roughened by application of a coating of catalytic material containing particles of diameter in the range from 0.1 to 10 microns.

8. A laser comprising:
a wall encircling a laser chamber;
means for producing an electrical discharge within said chamber;
a reflector structure adapted to reflect light in a path that produces lasing of a fluid within said laser chamber; and
a roughened, catalytic surface, that has been roughened by application of a coat of lumpy catalytic material.

9. A laser comprising:
a wall encircling a laser chamber;
means for producing an electrical discharge within said chamber;
a reflector structure adapted to reflect light in a path that produces lasing of a fluid within said laser chamber; and
a roughened, catalytic surface, that has been roughened by
application of a layer of material that has been processed to form a roughened surface; and
a coating of catalytic material on a top surface of said roughened surface.

10. A laser as in claim 9 wherein said layer of roughened material is selected from the class consisting of activated charcoal, zeolite and sol gel.

11. A laser as in claim 10 wherein said layer of material that has been processed to form a roughened surface is attached to an inner surface of said sidewall of said laser.

* * * * *